US005545288A

United States Patent [19]

Canela et al.

[11] Patent Number: 5,545,288

[45] Date of Patent: Aug. 13, 1996

[54] STAMP DISPENSING AND ENVELOPE HANDLING DEVICE

[76] Inventors: Heriberto Canela; Giovanni R. Rodriguez, both of 8027 W. 14th Ave., Hialeah, Fla. 33014

[21] Appl. No.: 545,474

[22] Filed: Oct. 19, 1995

[51] Int. Cl.[6] .......... B32B 31/00

[52] U.S. Cl. .......... 156/578; 156/532; 156/442

[58] Field of Search .......... 156/578, 556, 156/530, 531, 532, 517, 441.5, 442, 442.2

[56] References Cited

U.S. PATENT DOCUMENTS

| | | | |
|---|---|---|---|
| 2,765,946 | 10/1956 | Mazzone | 156/532 |
| 3,101,282 | 8/1963 | Glassco et al. | 156/442 X |
| 3,219,511 | 11/1965 | Moser et al. | 156/532 |
| 3,793,124 | 2/1974 | Babb et al. . | |

FOREIGN PATENT DOCUMENTS

| | | | |
|---|---|---|---|
| 376517 | 5/1923 | Germany | 156/532 |

*Primary Examiner*—James Engel
*Attorney, Agent, or Firm*—J. Sanchelima

[57] ABSTRACT

A device for dispensing moistened stamps from a web wherein contiguous individual stamps are separated by a plurality of perforations. The individual stamps are cut with a cutting blade that is part of a stamp affixing assembly. When the blade is actuated by a user through a spring biased cover, the web of stamps is also advanced over a moistening pad member that is simultaneously brought against the web. The web is advanced through wheels that translate the linear reciprocating movement to a rotational movement. A water reservoir provides a constant source of water to the moistening pad.

4 Claims, 2 Drawing Sheets

STAMP DISPENSING AND ENVELOPE HANDLING DEVICE

BACKGROUND OF THE INVENTION

1. Field of the Invention

The present invention relates to a stamp dispensing and envelope handling device.

2. Description of the Related Art

There are many stamp dispensers, most of them manually operated. The closest prior art corresponds to a stamp affixer with Babb et al. U.S. Pat. No. 3,793,124 issued in 1974 and assigned to Data-link Corporation, doing business in San Diego, Calif. However, it differs from the present invention because a postage stamp is moistened using a simple mechanism, where only a sponge, constantly in contact with water, moistens the gummed side of the stamp. The present invention also discloses a pad assembly for cutting and affixing a stamp on an envelope with a simple structural body that would have less opportunities to be damaged and thereby having no need of the replacement for spare parts. The present invention, also discloses a multipurpose dispensing device that provides a user a more compact device with several features to store, weigh, moisten and affix a postage stamp on an envelope. Babb's patented device requires the squirting of water through perforations 232. These perforations are susceptible to becoming clogged after being used for a given time and the water applied to the stamp is not uniform (dependent, interalia, on how fast the "single" movement is applied by the user). The present invention resolves this problem by making the application of water to the stamp movement applied by the user.

SUMMARY OF THE INVENTION

It is one of the main objects of the present invention to provide a device that permits a user to stick a stamp cut from a continuous roll and affix it on an envelope without the need of individual handling of the stamp by the user.

It is another object of this invention to provide a device that includes storage for the envelopes and a scale for weighing same.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 3:
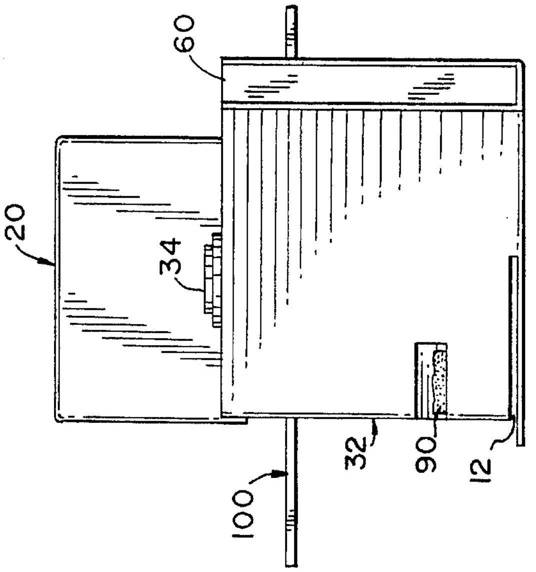
FIG. 3 illustrates an elevational rear view of this invention.

Referring now to the drawings, where the present invention is generally referred to with numeral 10, it can be observed that it basically includes housing 14 and actuating cover 20 enclosing stamps roll R and cam-gear mechanism 40 for moistening and affixing stamps on envelopes. Water reservoir 32 is mounted adjacent to housing 14 above bottom surface 16. Additionally, scale assembly 100 is cooperatively mounted adjacent to housing 14 on bottom surface 16.

Figure 1:
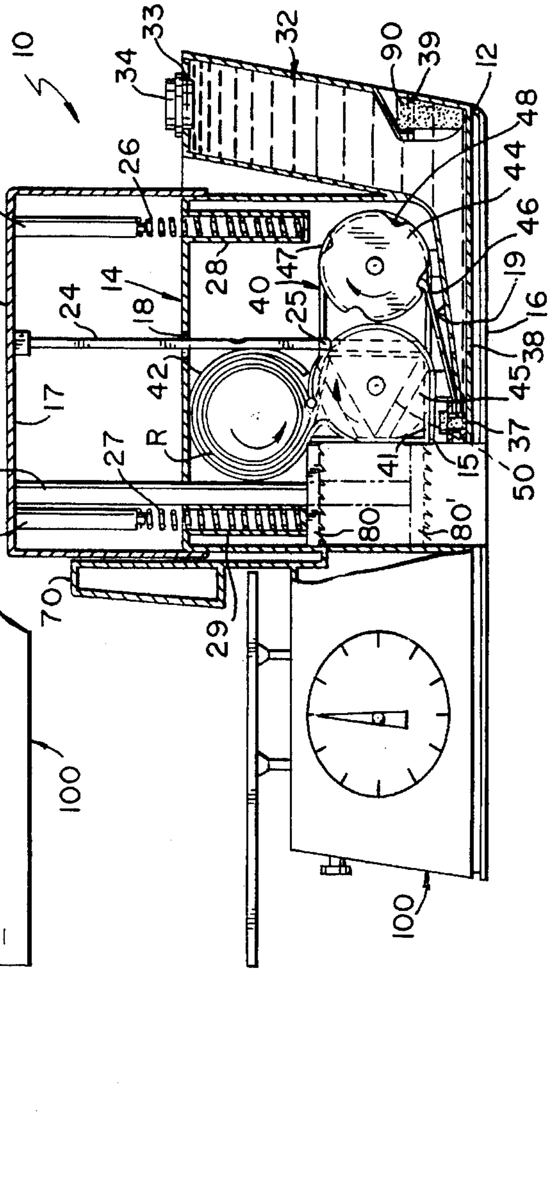
FIG. 1 represents a partial cross section of the invention.
Figure 4:
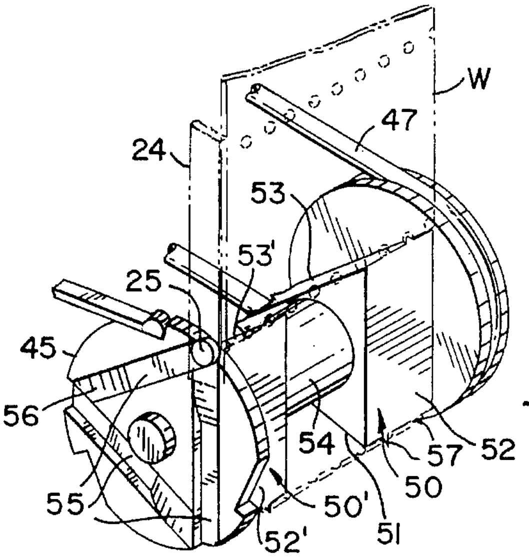
FIG. 4 is an isometric view of the triangular blocks being a part of the cam-gear mechanism for the present invention.
Figure 5:
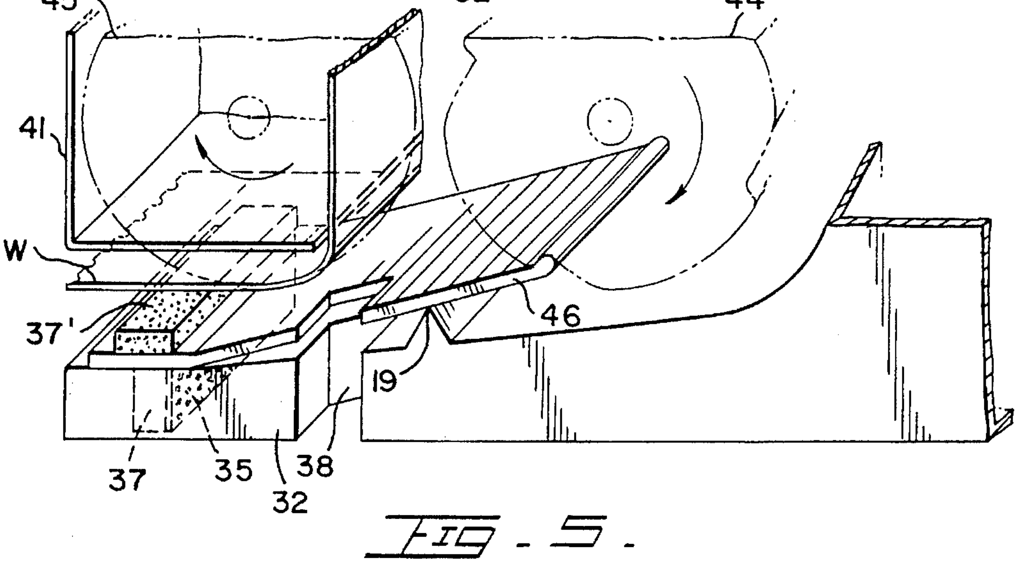
FIG. 5 shows a partial isometric view of the cam-gear mechanism.

Referring now to FIG. 1, it can be seen that water reservoir 32 is mounted adjacent to housing 14. Reservoir 32 includes opening 33 and cap 34 through which water is poured. As best seen in FIG. 5, inside reservoir 32 there is semi-permeable wall 35 that permits a predetermined amount of water to come in contact with sponge member 37. Sponge member or moistening pad 37 has a wetting contact surface 37' and a plug portion perpendicularly extending from area 37'. Sponge member 37 is reciprocally actuated and moved up and down by cam lever 46 which is cammingly engaged to driven cam wheel 44. Driven cam wheel 44 in turn is driven by belt member 47 which is trained over transmitting wheel 43 mounted at the outer end of triangular blocks 50 and 50', as best seen in FIGS. 1 and 4. Triangular blocks 50 and 50' are preferably symmetrical and kept at a parallel and spaced apart relationship with respect to each other by axle 54. Blocks 50 and 50' include each surfaces 51; 52 and 53 (and 51'; 52' and 53'), respectively. Unprimed and primed surfaces are intended to coincide with similar planes in blocks 50 and 50'.

When a user presses down on actuating cover 20, guiding members 21 and 22 are inserted in guiding cylinders 28 and 29 causing springs 26 and 27 to compress thereby opposing the user's applied force, as best seen in FIG. 1. Actuating elongated member 24 is rigidly mounted at its upper end to the inner surface of top wall 17 and the other end has protuberance 25 that is received within slots 55. Member 24 passes through opening 18 located in the uppermost portion of housing 14. The lowermost portion of member 24 ends its travel passing through cut out 38, as shown in FIG. 5. As illustrated in FIG. 4, slots 55 include wedges 56 at one end. Protuberance 25 is cammingly urged to one side of slot 55 after rotating driving wheel 45. At the upper end of slot 55, the user's downwardly force is transmitted against the side wall of slot 55 causing wheel 45 and blocks 50 and 50' to rotate. Stamp web W is caused to advance by protrusions 57 that engage the conventional perforations that separate individual stamps in web W. As seen in FIG. 1, protrusions 57 are designed to engage the perforations typically found between contiguous stamps in stamp roll R within stamp housing member 42. Protrusions 57 pull down web W of stamps with the adhesive surface exposed so that when it is in the lowermost (horizontal) position, it comes in contact with sponge member 37 when lifted by lever 46 which pivots about point 19, as best seen in FIG. 5.

Sponge member 90 is preferably positioned at one end of water reservoir 32 to permit a user to moisten the envelope's flap having the adhesive, as best seen in FIGS. 1 and 3. Sponge member 90 acts like a plug to opening 39 in reservoir 32 thereby maintaining member 90 wet at all times.

Figure 6:
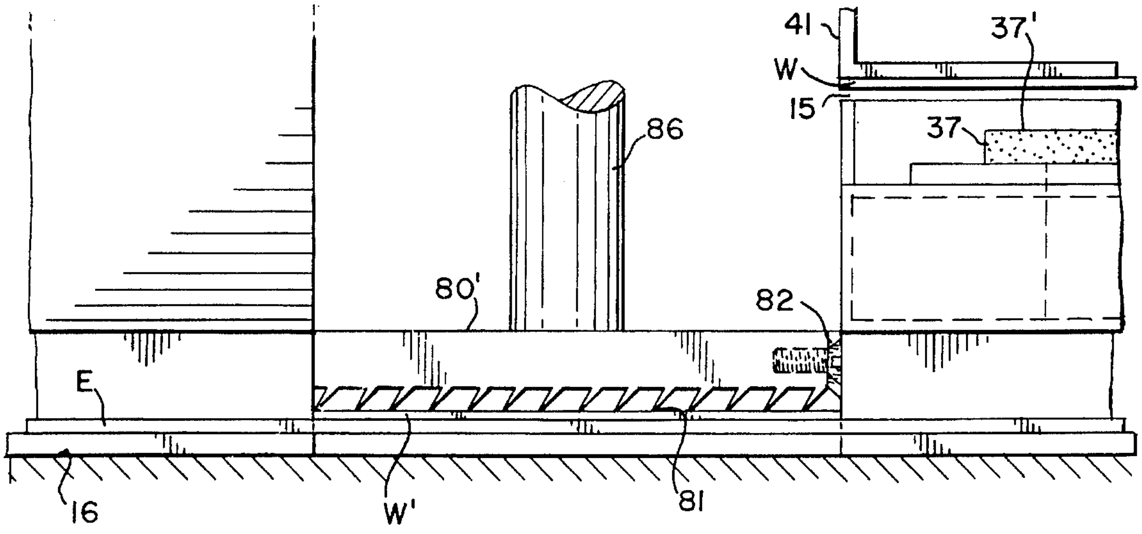
FIG. 6 illustrates the stamp cutting mechanism when a stamp is cut by a cutting tool.

Web W is advanced a predetermined distance which is equal to the width of an individual stamp. As web W is passing by sponge member 37 the latter pushes web W upwardly against backing wall 41 thereby picking up moisture, as best seen in FIGS. 5 and 6. As stamp web W travels outwardly through slot 15 in housing 14, stamp affixing pad assembly 80 moves downwardly. As shown in FIG. 1, pad assembly 80 is rigidly mounted to the wall 17 by elongated tubular member 86. FIG. 6 shows the lowermost position for assembly 80' pressing web W' against envelope E. Lower surface 81 includes pattern of inclined ribs designed to provide a more uniform pressure against web W'. Cutting blade 82 shaves off the protruding end of web W, which corresponds to one stamp. Web W stops advancing after protuberance 25 leaves slot 55 in its downwardly travel.

To operate dispenser 10, a user inserts an envelope through opening 12, slides it through over bottom surface 16 until it reaches a predetermined position below pad assembly 80. Once in position, a user applies a sufficient linearly downwardly force against cover 20 causing driving wheel 45 to rotate clockwise. This rotational movement is transmitted to driven wheel 44 through belt member 47 mounted also on transmitting pulley wheel 43. Once driven wheel 44 rotates, lever 46 is cammingly forced to leave notch 48 thereby causing sponge member 37, at the other end of lever 46, to be lifted. Sponge member 37 moves up to moisten web W on the adhesive side. As explained above, web W is caused to advance as wetting contact surface 37' comes in contact with the adhesive side of web W. After protuberance 25 clears slot 55 (extending downwardly passed the end of slot 55), driving wheel 45 does not move anymore and neither does web W. Pad assembly 80, on the other hand, continues its downwardly travel, cutting the outermost end of web W (corresponding to one stamp in the preferred embodiment). Sufficient force is applied to the stamp, with the adhesive side already wet, to cause it to adhere to envelope E. Subsequently, a user slides the side of the envelope flap with the adhesive on by sponge member 90, thereby wetting it before folding it to close envelope E.

A new roll or web of stamp W is inserted through a hingedly lateral door (not shown in the drawings) located in housing 14. Different designs for the insertion and/or replacement of web W can be provided for.

Figure 2:
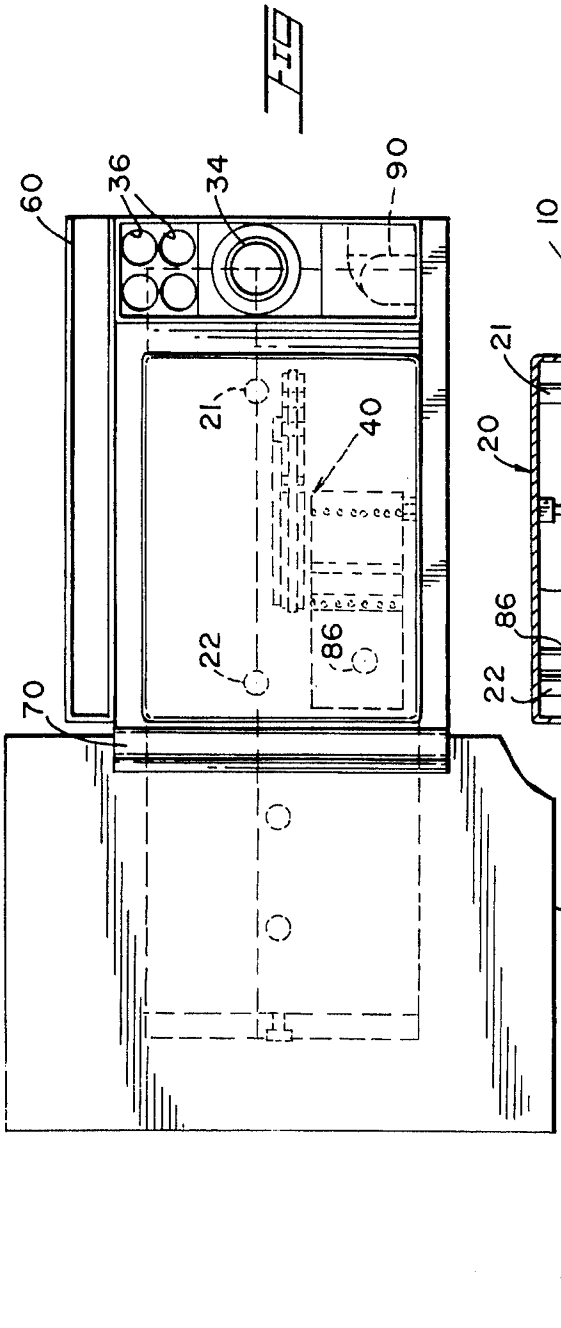
FIG. 2 shows a top view of the device illustrated in the previous figure.

Rack 60 is incorporated in the entire structure of the invention and permits a user to store blank envelopes and/or other utensils. In the same manner, cavity holders 36 are designed to hold pens and pencils, as shown in FIG. 2. Embodiment 10, also includes separator member 70 that avoids a user's hand from reaching scale assembly 100, as shown in FIG. 1.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A device for dispensing moistened stamps from a web wherein contiguous individual stamps are separated by a plurality of perforations and individually affixed to an envelope that includes a flap, comprising:

a) housing means;

b) spring biased cover means mounted to said housing means and said spring biased cover means includes an internal surface and a first elongated member having first and second ends, said first end being mounted to said internal surface and said first elongated member adapted to move linearly and reciprocally inside said housing means;

c) driving wheel means rotatably mounted within said housing means and cooperatively engaged to said second end for transforming the reciprocal linear movement into rotational movement, and said driving wheel means further including cooperative surfaces with protrusions for cooperatively engaging said web;

d) belt member trained over said driving wheel means;

e) driven wheel means rotatably mounted within said housing means and driven by said driving wheel through said belt member;

f) blade means including a second elongated member rigidly mounted to said internal surface causing said blade means to move linearly and reciprocally in response to a user's action on said spring biased cover means; and g) moistening pad means mounted within said housing means and including linkage means connected to said driven wheel means so that said moistening pad means moves linearly and reciprocally towards and away said web thereby bringing said moistening pad means in contact with said web as the latter advances.

2. The device set forth in claim 1 further including a water reservoir member connected to said moistening pad means to maintain the latter constantly moistened.

3. The device set forth in claim 2 further including a sponge plug member mounted to said reservoir member and said sponge plug member having cooperative exposed dimensions to permit a user to moisten the flap of said envelope.

4. The device set forth in claim 3 further including scale means for weighing said envelopes and said scale means being mounted adjacent to said housing means.

* * * * *